United States Patent [19]

Cobble

[11] Patent Number: 5,499,572
[45] Date of Patent: Mar. 19, 1996

[54] BI-TECH PISTON

[76] Inventor: Daniel L. Cobble, P.O. Box 2281, Oak Harbor, Wash. 98277

[21] Appl. No.: 422,638

[22] Filed: Apr. 14, 1995

Related U.S. Application Data

[63] Continuation of Ser. No. 91,246, Aug. 26, 1993, abandoned.
[51] Int. Cl.$^6$ .................................. F16J 1/04; F02F 3/00
[52] U.S. Cl. ............................. 92/212; 92/216; 92/219; 92/222; 123/193.6
[58] Field of Search ............................. 92/212, 215, 216, 92/220, 221, 222, 255, 256, 219; 123/193.6

[56] References Cited

U.S. PATENT DOCUMENTS

| | | | |
|---|---|---|---|
| 1,603,611 | 10/1926 | Kottusch | 92/221 |
| 3,610,111 | 10/1971 | Dilks, Jr. | 92/221 |
| 4,306,489 | 12/1981 | Driver et al. | 92/212 |
| 4,356,800 | 11/1982 | Moebus | 92/216 |
| 4,440,069 | 4/1984 | Holtzberg et al. | 123/193.6 |
| 4,450,610 | 5/1984 | Schäper | 92/212 |
| 4,603,617 | 8/1986 | Barth et al. | 92/216 |
| 4,727,795 | 3/1988 | Murray et al. | 92/216 |
| 5,029,562 | 7/1991 | Kamo | 92/221 |
| 5,174,193 | 12/1992 | Parker et al. | 92/212 |
| 5,193,435 | 3/1993 | Parker | 92/212 |

FOREIGN PATENT DOCUMENTS

| | | | |
|---|---|---|---|
| 0049006 | 4/1982 | European Pat. Off. | 92/212 |
| 565853 | 9/1930 | Germany | 92/221 |
| 365075 | 1/1932 | United Kingdom | 92/221 |
| 2129523 | 5/1984 | United Kingdom | 92/216 |

*Primary Examiner*—Thomas E. Denion
*Attorney, Agent, or Firm*—Christensen O'Connor Johnson & Kindness

[57] ABSTRACT

A piston for developing compression within the cylinder of a combustion engine or other type compression generating apparatus; said piston being a two-piece assembly, whereas the topside portion, or traditionally known as the crown, being of relative disc-shape in relation to asymetrics of said piston, is connected to the lower portion, or traditionally known as the skirt, by a distinct fastening means that consist of said crown being concaved from the underside and having multiple vertically positioned ridges that align the inside perimeter of said underside. Said skirt has another set of matching vertically positioned ridges that align the outer perimeter at the top of said skirt, as said top is appropriately sized to match said underside of said crown so that said crown may be press-fitted to said top of said skirt for a rigid and complete piston assembly. Said two-piece assembly allows said piston to be comprehensively configured of two distinctively different material compositions, such as, said crown being composed of a latent-cast elemental metal and said skirt being composed of a resin-based epoxy.

19 Claims, 3 Drawing Sheets

BI-TECH PISTON

CROSS-REFERENCE OF RELATED DOCUMENTS

This application is a File Wrapper Continuation application based on prior copending application Ser. No. 08,091,246, filed on Aug. 26, 1993, now abandoned.

BACKGROUND OF THE INVENTION

The present invention, otherewise known as The Bi-tech Piston, relates generally to the category of engines, and most specifically to pistons. Hence, the bi-tech piston is also applicable to other compression-generation type apparatus such as high-performance compressors that utilize the piston construct.

For some time now, researchers have been testing the feasibility of injection-molded, resin-based epoxy and silicon systems as formed pistons within combustion-type engines and high-performance compressors. These plastic-based compounds are usually mixed with metals and/or alloys for added resilience.

The advantages of developing success of such a piston is twofold: First, pistons composed of plastics are notably lighter in weight, and therefore, respective bi-directional piston strokes within the cylinder proceeds with less resistance, to render increased power output from an engine that requires less fuel. Also, ongoing manufacture of such a piston would conserve much of the high energy consumption, worldwide, that result from the forged-cast processes of presently produced pistons. Hence, such an engine would be economically prudent and environmentally forgiving.

Secondly, since resin-based systems require only injection-type molding, much less work and energy is required for production and thereby a significant reduction in production costs. Furthermore, plastic materials are inherrently less expensive than metals and alloys. Therefore, successfully produced resin-based pistons would be important cost considerations for engine and compressor manufacturers, in which relative savings could be passed on to consumers.

The mechanical properties of these epoxy systems have proven to be quite excellent. Some composites have been tested to have tensile strength that is stronger than steel and temperature tolerances of up to 3000° F. These characteristics are quite suitable for use in combustion engines.

However, there exist a fatigue problem with the projection area of these pistons; the topside, or crown of the piston, which directly contacts and is exposed to the combustion/ignition-firing and/or compressed properties within the cylinder, suffers from surface fatigue-breakdown and the texture of such composites is in homogeneous for such piston structures when mixed with metals or alloys; the projection area cannot withstand such continuous exposure. Furthermore, this problem has caustic effects on the projection area of pistons of combustion engines, whereas fatigue-breakdown occurs relatively quickly due to ongoing cylinder combustion. Up to this point, no combination of alloys and epoxies have been found to remedy this problem.

What is desired is a suitable solution that allows plastic/resin-based pistons to be utilized within combustion engines and high-performance compressor apparatus, so that consumers and the environment can reap the rewards of increased efficient engines and compressors that requires less effort for manufacturers to produce.

SUMMARY OF THE INVENTION

Up to this point, the conventional mindset of the piston industry has been the single-piece piston construct, whereas the entire piston, less the rings and other independently moving parts, is the result of a single mold that is subjected to a particular casting process. Such process is usually the forged-cast type that forms pistons of light-weight alloys or aluminum, for developing the desired hardness. Many of these alloys inherrently possess the homogeneous texture required for the exposed projection area of the piston.

However, such texture is only necessary for the projection area, of which is the only portion of the piston to be subjected to the actual combustion and compression forces within the cylinder; this area is typically known as the piston crown.

The present invention involves the composite assembly of a two-piece structure whereas the crown is of a distinctively different construct than that of the piston's lower portion, of which such lower portion is typically known as the skirt of the piston.

This apparatus arrangement allows each respective portion of such piston to be composed of the particular material that is appropriately suited for the mechanical condition of each such respective portion. Since the crown is the only portion of the piston that is exposed to combustion and/or compression forces within the cylinder, there is no need of the entire piston structure to be composed of the same composite material/s. Consequently, the skirt need only have structural properties for sustaining high-velocity travel through the cylinder and upper cross-surface impact from the crown's respective cross-surface area. Therefore, these two distinct mechanical conditions may effectively rely on different materials for their respective constructs.

The present invention, or the bi-tech piston, exploits such mechanical conditions. The purpose and objective of the bi-tech piston is to eliminate the need, wherever possible, for the expensively-produced forged-cast alloy/aluminum piston and to make the piston lighter in weight, for decreased fuel consumption. The term "bi," meaning "two," implies the utilization of two distinct technologies, or material compositions, for a single piston construct; ideally, the crown is composed of a sufficiently hard metal, and the skirt is composed of a sufficiently rigid plastic-base composite.

Hence, the crown, being the topside portion of such piston is a relatively thin, disc-like plate that may be composed of naturally hard, elemental metals such as latent-cast iron or tempered graphite. Although such metals are heavier than traditionally used alloys or aluminum, the crown takes up only a small portion of the piston assembly, as the larger skirt, being composed of a plastic-based composite, is sufficiently rigid and lighter in weight to compensate for the slightly heavier crown.

In this way, since latent-cast and direct injection-mold processes are less expensive than forged-cast processes, and, since plastics are inherrently less expensive than metals, desired hardness of the crown is achieved while reducing the piston's net weight and overall expense of production.

Since the crown acts as a shield to isolate cylinder combustion and/or compression forces from the piston's skirt, such disc-like shaped crown may be considered, functionally, as a blasting-plate. Accordingly, since the skirt respectively secures, sustains, bolsters, and supports such crown during piston-travel through the cylinder, such skirt may be considered, functionally, as a force-carrier.

An effective binding/fastening means that firmly attaches such blasting-plate/crown to such force-carrier/skirt poses no problem of separation between the two portions, because combustion and/or compression forces always push downward against the blasting-plate for virtually constant and consequential contact between such blasting-plate and force-carrier. As a matter of course, theory dictates that such blasting-plate and force-carrier will remain in contact throughout the ongoing stroke cycles, with such blasting-plate being effectively pressed against such force-carrier for continuous and effective contact, even without such fastening means, due to such constant downward forces of combustion and compression.

At any rate, utility design of such fastening means is of utmost importance to prescribed functional parameters and production costs of the bi-tech piston assembly. Hence, the ideal fastening means should allow for simultaneous lesser material utilization, for further weight reduction, and effective binding at the least expensive cost to the manufacturer, and considerations must allow for engine-block oil to flow through the force-carrier for direct contact with the bottomside of the metal blasting-plate, for desired cooling of the exposed projection area.

The fastening means for the present invention invloves the blasting-plate and force-carrier having respectively mated ridged rims that are press-fitted together for an extremely tight bind; the blasting-plate having a bottomside inner ridged rim that aligns the perimeter to mate with the outer ridged rim of the force-carrier's topside perimeter. This fastening design is quite effective, because, since engine heat causes the rim of the metal blasting-plate to expand larger than the mated plastic-composite rim of such force-carrier, the bind between these mated rims tightens as the engine temperature rises. Two narrow spacings intervene such rim's perimeter of such force-carrier at opposite points to allow such rim to gradually convergee to a slightly smaller size as such mated rim of such metal blasting-plate expands, thereby requiring slightly more perimeter space than such plastic-composite rim of such force-carrier.

Since this fastening means involves only the outward circumference of the piston, weight of the force-carrier is reduced by being thoroughly hollow. Weight of the blasting-plate is even further reduced by being concaved from the bottomside to form an inverted dome. Such an inverted, dome-shaped configuration forms an extremely rigid structure in reference to the downward forces of cylinder combustion and/or compression; also, such structural rigidity allows the blasting-plate to be relatively thin at the top, for further weight reduction.

Since the inner ridged rim of the blasting-plate must have vertical depth for adequate binding to the force-carrier, such vertical height of such blasting-plate must be tall enough to accommodate such ridged rim, and consequently, such vertical height is high enough for such blasting-plate to accommodate outer perimeter deployment of the uppermost compression-ring, with the provision of a respective groove that aligns the outer perimeter of such blasting-plate. Such blasting-plate and force-carrier, when brought together for assembly, also provides a second groove for respective placement of the middle compression-ring.

Besides the acquired weight reduction, another advantage of this type of fastening means is the ease of assembly, because the method ridged rims are the only parts required for effective binding by simply being press-fitted together, and thereby, allowing further reduction in assembly costs. Furthermore, since the force-carrier is effectively hollow, oil travels openly through such force-carrier for effective contact with the bottomside of such blasting-plate, for respective cooling of the projection area.

The separate functions of the blasting-plate and force-carrier, and therefore, the distinctive material compositions required for each function, establishes new parameters and conditions for which this new-type piston may operate, which allows the overwhelming portion to be composed of high-tech plastic. Such apparatus configuration would establish new production precedence for the automotive and high-performance compressor industries.

When fully assembled, the bi-tech piston has the same fundamental appearance as the traditional piston, except for texture and probable color differences between the respective composite materials of such blasting-plate and force-carrier, respectively, the crown and skirt. The connecting-red attaches to the skirt by the wrist-pin, as accomplished for the traditional piston. Therefore, the bi-tech piston allows such wrist-pin, connecting-rod, and portions of the crankshaft to be materially composed of the same composite material/s as the force-carrier.

LIST OF ILLUSTRATIONS

DETAILED DESCRIPTION OF PREFERRED EMBODIMENTS

Figure 1:
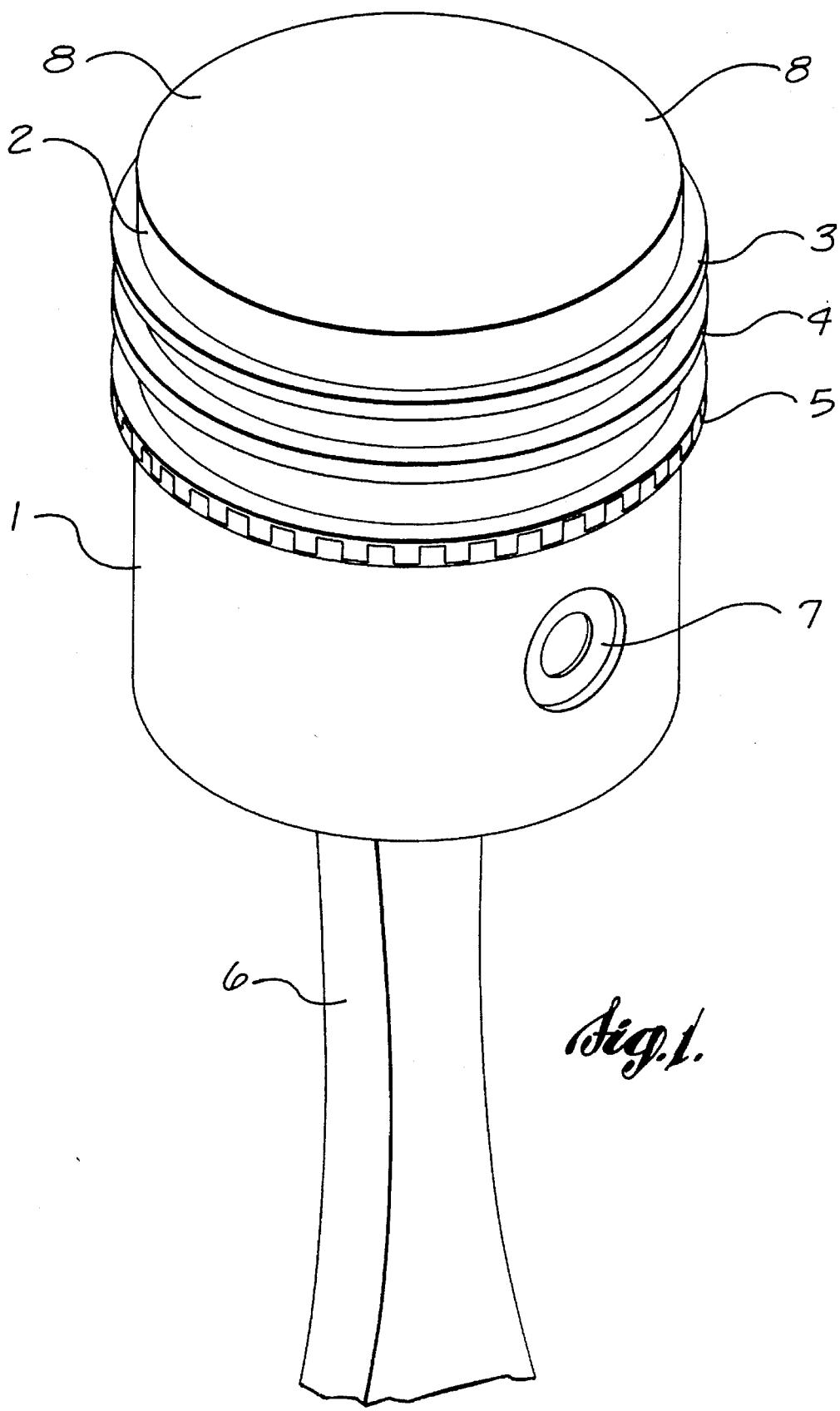
FIG. 1 is a composite view of the bi-tech piston, as the present invention.

FIG. 1 is a composite view of the present invention as the bi-tech piston, whereas force-carrier 1 is distinctively connected to blasting-plate 2 so that the bi-tech piston is a two-piece composite assembly. Topside of said blasting-plate depicts projection area 8. Uppermost compression-ring 3 is seated above middle compression-ring 4, as lubricant-ring 5 is positioned below said middle compression-ring. The bi-tech piston attaches to connecting-rod 6 by way of wrist-pin 7, as in the usual manner for the traditional-type piston.

Figure 2:
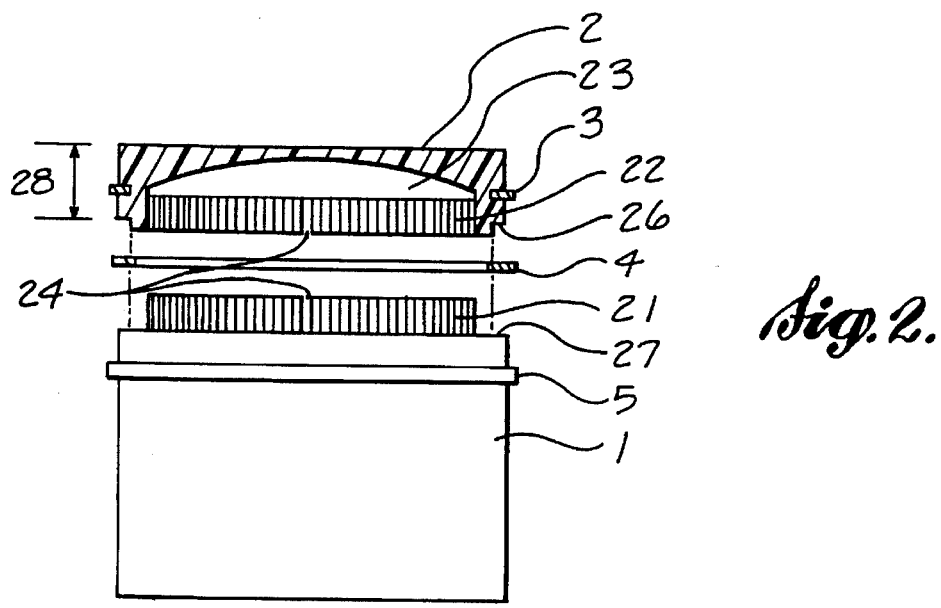
FIG. 2 is a side view of the bi-tech piston with the blasting-plate and uppermost compression-ring detached.

FIG. 2 shows a side view of the bi-tech piston whereas blasting-plate 2 is lifted away from force-carrier I to show how said blasting-plate and said force-carrier are mated together by inner ridged rim 22 of said blasting-plate and outer ridged rim 21 of said force-carrier. Although said inner ridged rim is within the underside of said blasting-plate, said inner ridged rim is shown exposed in FIG. 2 to depict the appropriate said mating of said blasting-plate and force-carrier. Consequently, underneathe dome-shaped space 23 depicts the hollowed-out, concaved configuration of said blasting-plate and provides significant structural rigidity in reference to the downward forces of cylinder combustion and compression that are exerted against said blasting-plate during engine operation. Said concaved configuration also reduces the weight of said blasting-plate. For adequate vertical binding space of said inner ridged rim to insure a rigid bind between said blasting plate and said force-carrier, vertical height 28 of said blasting-plate is made taller and, therefore, allows adequate accommodation for fitting uppermost compression-ring 3 to the outer perimeter of said blasting-plate. Narrow-spacing 24 intervenes said outer ridged rim, for respective perimeter convergence of said outer ridged rim to a slight size reduction, to accommodate heat expansion of said inner ridged rim of said blasting-plate, during engine operation.

Point 27 on said force-carrier depicts the location where right-angled inset 26 of said blasting-plate joins said force-carrier to form a compression-ring groove for respective placement of middle compression-ring 4, during assembly, in reference to guidelines 25. Lubricant-ring 5 is shown inplace on said force-carrier as part of the intended finished assembly.

Figure 3:
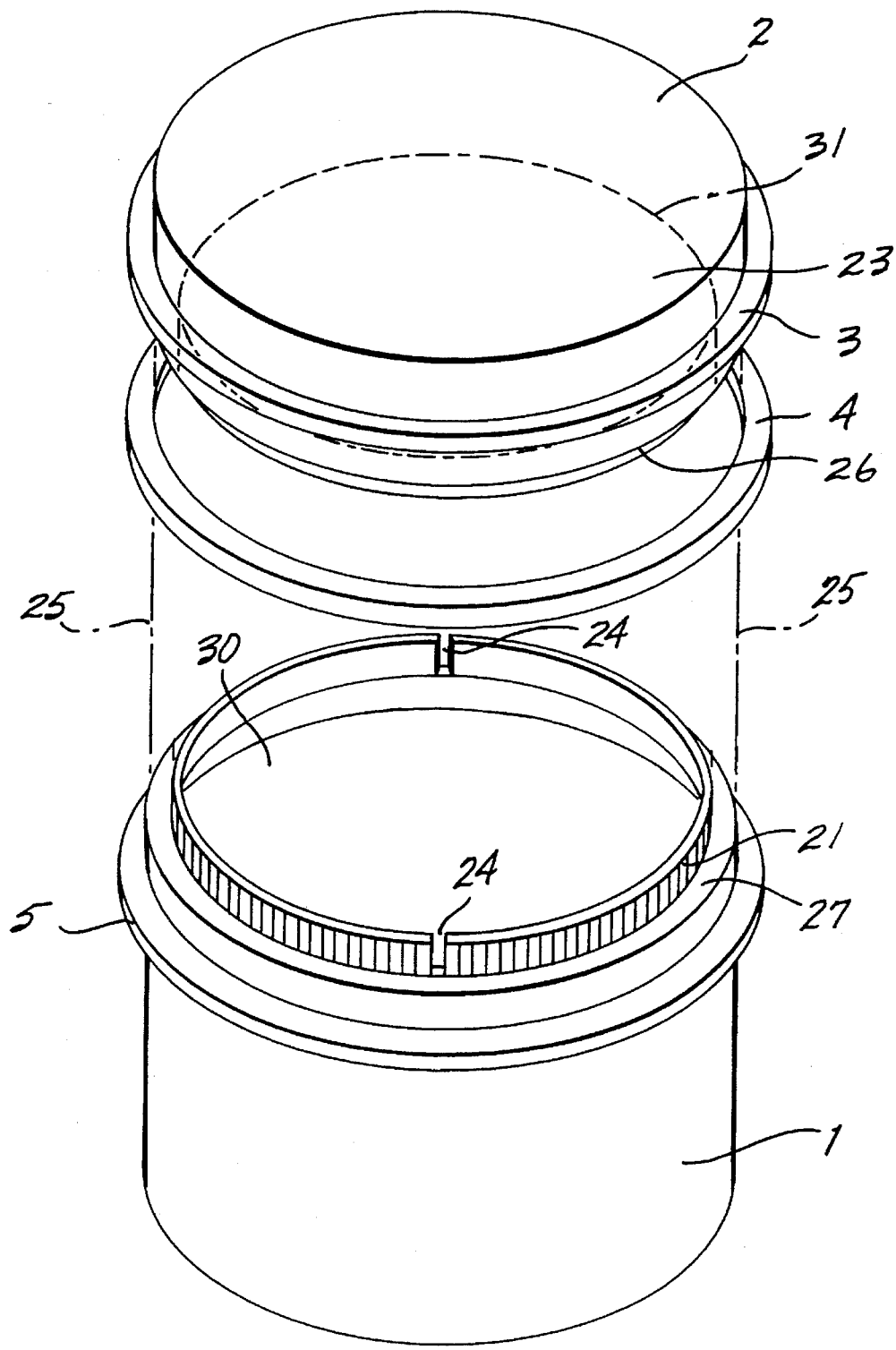
FIG. 3 is an exploded perspective view of the bi-tech piston.

FIG. 3 shows an exploded view of the bi-tech piston, to depict a perspective top view 30 of said force-carrier in reference to said blasting-plate. Said top view shows the hollow-through condition of said force-carrier so that oil from the engine-block may pass directly through said force-carrier for thorough contact with said underneathe dome-shape area 23 of said blasting-plate, as outlined by dotted line 31.

In reference to FIG. 3, please refer to FIG. 2 for further correlation of all other numerals.

Figure 4:
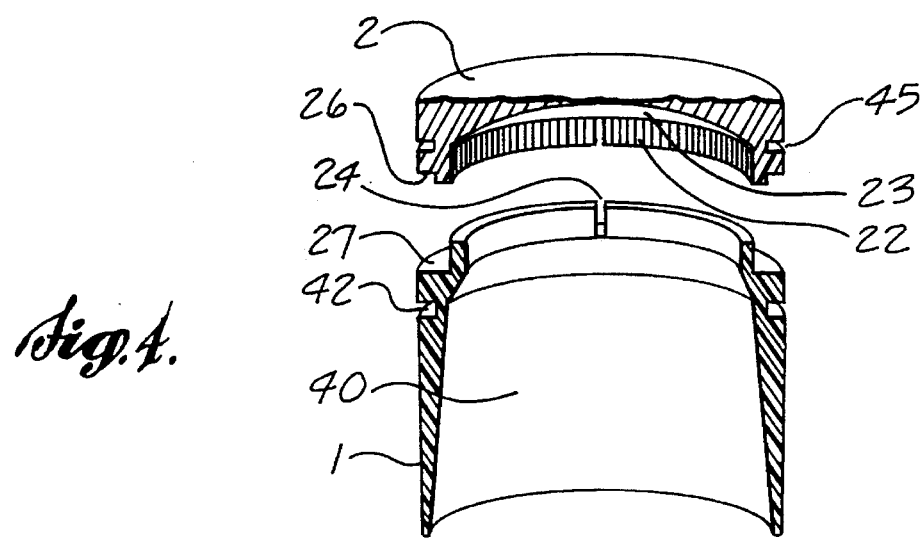
FIG. 4 is a cut-away view of the bi-tech piston with the compression-rings and lubricant-ring removed.

FIG. 4 shows a cut-away view of the bi-tech piston, to depict a perspective view of said underside dome-shaped/concaved condition 23 of said blasting-plate and thoroughly hollow-through condition 40 of said force-carrier. Upper-most compression-ring groove 45, middle compression-ring inset 26, and lubricant-ring groove 42 are shown without respective compression-rings and lubricant-rings being in place; FIGS. 1,2,and 3 shows placement of said rings.

In reference to FIG. 4, please refer to FIGS. 1 and 2 for further correlation of all other numerals.

What I claim is:

1. A modular piston, for use in a combustion-type engine for developing compression, in which said piston is manufactured as having a distinctive removable crown and skirt portions to form a composite assembly as said piston; said composite assembly having a crown of the piston, for direct contact with compression or combustion gases in a cylinder, in which the material or materials that compose said crown are of different material from said skirt, said skirt adapted to sustain, support, and bolster said crown during movement through said cylinder, said crown and skirt being fastened together and keyed to prevent separation and relative rotation thereof during use, said crown being composed of metal and said skirt being composed of at least one of plastic composite, plastic based material, materials including plastics, resin-based epoxies, and silicon, said piston including further: a fastening means for securely binding said crown and said skirt as a composite assembly in a rotation resistant inter-engagement, in which said crown and said skirt are press-fitted together, at the underside of said crown and at the top of said skirt by mutually mated rims, as one of said mutually mated rims align the perimeter of the cross-surface clearance of said underside, and the other rim aligns said top perimeter of said skirt.

2. The modular piston of claim 1, wherein said skirt rim and said crown rim form a rotation-resistant inter-engagement.

3. The modular piston of claim 2, wherein the top of said skirt is substantially open, the crown capping the top of said skirt and having the underside of said crown substantially exposed to the inside of said skirt such that the crown is well cooled.

4. The modular piston of claim 1, wherein said crown rim is disposed substantially around the outer perimeter of said crown and wherein said skirt rim is disposed concentric with the outer perimeter of said skirt and inwardly shifted therefrom, said crown rim and said skirt rim being oriented parallel to the skirt axis for removable attachment of said crown to said skirt.

5. The modular piston of claim 4, wherein said skirt rim includes ridges oriented parallel to said skirt axis on the outer surface of said skirt rim for increased binding strength and rotational resistance between said crown and said skirt, and wherein said crown rim includes ridges oriented parallel to said skirt axis on the inner surface of said crown rim, said crown ridges engaging said skirt ridges.

6. The modular piston of claim 4, wherein said crown includes a cross-sectionally right-angled first inset groove that aligns horizontally along the outer perimeter of said crown, the modular piston further comprising a ring removably disposed between said first inset groove and the top of said skirt.

7. The modular piston of claim 4, wherein said skirt includes a skirt groove disposed horizontally around said skirt, the modular piston further comprising a skirt ring sized to be received around said skirt groove.

8. A modular piston for attachment to a force-transmitting rod and for use within a cylinder that is subject to substantial compressive forces of gases, the piston comprising:

(a) a skirt having a top and a bottom, said skirt being made of a lightweight strong material and being generally cylindrical in shape with a through opening extending from the bottom to the top, said skirt including an attachment means for securing the force-transmitting rod; and (b) a crown removably attached to the top of said skirt, said crown being constructed of a different, higher density material than said skirt said crown material being strong enough to resist the compression forces within a cylinder, the through opening in the top of said skirt exposing at least a portion of the underside of the crown, wherein said skirt and said crown are attached with means for allowing significantly different rates of thermal expansion of said skirt and said crown, wherein said skirt includes a skirt rim projecting upwardly from the top thereof, and wherein said crown includes a crown rim projecting downwardly and being press fit over said skirt rim, said skirt rim including slots extending vertically therein for allowing adequate convergence of said skirt rim to accommodate the thermal expansion of said crown rim.

9. The modular piston of claim 8, wherein said crown in composed of metal and said skirt is composed of plastic composite.

10. The modular piston of claim 8, wherein said skirt rim and said crown rim form a rotation resistant inter-engagement.

11. The modular piston of claim 10, wherein the top of said skirt is substantially completely open, the crown capping the top of said skirt and having the underside of said crown substantially exposed to the inside of said skirt such that the crown is well cooled.

12. The modular piston of claim 11, wherein the underside of said crown is concave in a dome shape.

13. The modular piston of claim 8, wherein said crown rim is disposed substantially around the outer perimeter of said crown and wherein said skirt rim is disposed concentric with the outer perimeter of said skirt and inwardly shifted therefrom, said crown rim and said skirt rim being oriented parallel to the skirt axis for removable attachment of said crown to said skirt.

14. The modular piston of claim 13, wherein said skirt rim includes ridges oriented parallel to said skirt axis on the outer surface of said skirt rim for increased binding strength and rotational resistance between said crown and said skirt.

15. The modular piston of claim 14, wherein said crown rim includes ridges oriented parallel to said skirt axis on the inner surface of said crown rim, said crown ridges engaging said skirt ridges.

16. The modular piston of claim 13, wherein said crown includes a cross-sectionally right-angled first inset groove that aligns horizontally along the outer perimeter of said crown, the modular piston further comprising a ring removably disposed between said first inset groove and the top of said skirt.

17. The modular piston of claim 13, wherein said skirt includes a skirt groove disposed horizontally around said skirt, the modular piston further comprising a skirt ring sized to be received around said skirt groove.

18. A piston for use in a combustion-type engine for developing compression, in which said piston is manufactured as having distinctive crown and skirt portions to form a composite assembly as said piston; said composite assembly having a crown of the piston, for direct contact with compression or combustion gases in a cylinder, in which the material or materials that compose said crown is of different material from said skirt, said skirt adapted to sustain, support, and bolster said crown during movement through said cylinder, said crown and skirt fastened together and keyed to prevent separation and relative rotation thereof during use, said crown being composed of metal and said skirt being composed of at least one of plastic composite, plastic based material, materials including plastics, resin-based epoxies, and silicon, said piston including further: a fastening means for securely binding said crown and said skirt as a composite assembly in a rotation resistant inter-engagement, in which said crown and said skirt are pressed-fitted together, at an underside of said crown and at a top of said skirt by mutually mated rims, as one of said mutually mated rims align an inner perimeter of the cross-surface clearance of said underside of said crown, and the other rim aligns the outer said top perimeter of said skirt; said skirt being effectively through-hollow in reference to the vertical/upright position of said skirt and in reference to the structural accommodations for said rim of said skirt; said crown having a formed cross-sectionally right-angled inset groove, as the first inset groove, that aligns horizontally along the outer perimeter of said crown for respective accommodation placement of a compression-ring or lubricant ring, and thus, forming a groove when said crown and said skirt are fitted together as a single assembly; said cross-surface clearance of said underside of said crown forming a distinctive hollowed-out inverted dome-shaped configuration above said rim within said crown; said mutually mated rims having vertically positioned ridges along the respective surfaces for increased binding strength; said rim of said skirt having narrow slots therein for allowing adequate convergence of said rim of said skirt to a smaller size, in relation to heat expansion of said rim of said crown.

19. The piston claimed in claim 18 wherein said piston to be used for generating/developing compression in compressors, said compressors including, but not limited to, air-conditioner compressors, compressors used for construction-type equipment, compressors used for drilling equipment, shipboard/marine equipment, and refrigeration equipment and wherein said mated rims are fluted to provide said rotation resistant inter-engagement.

* * * * *